Figure 1:
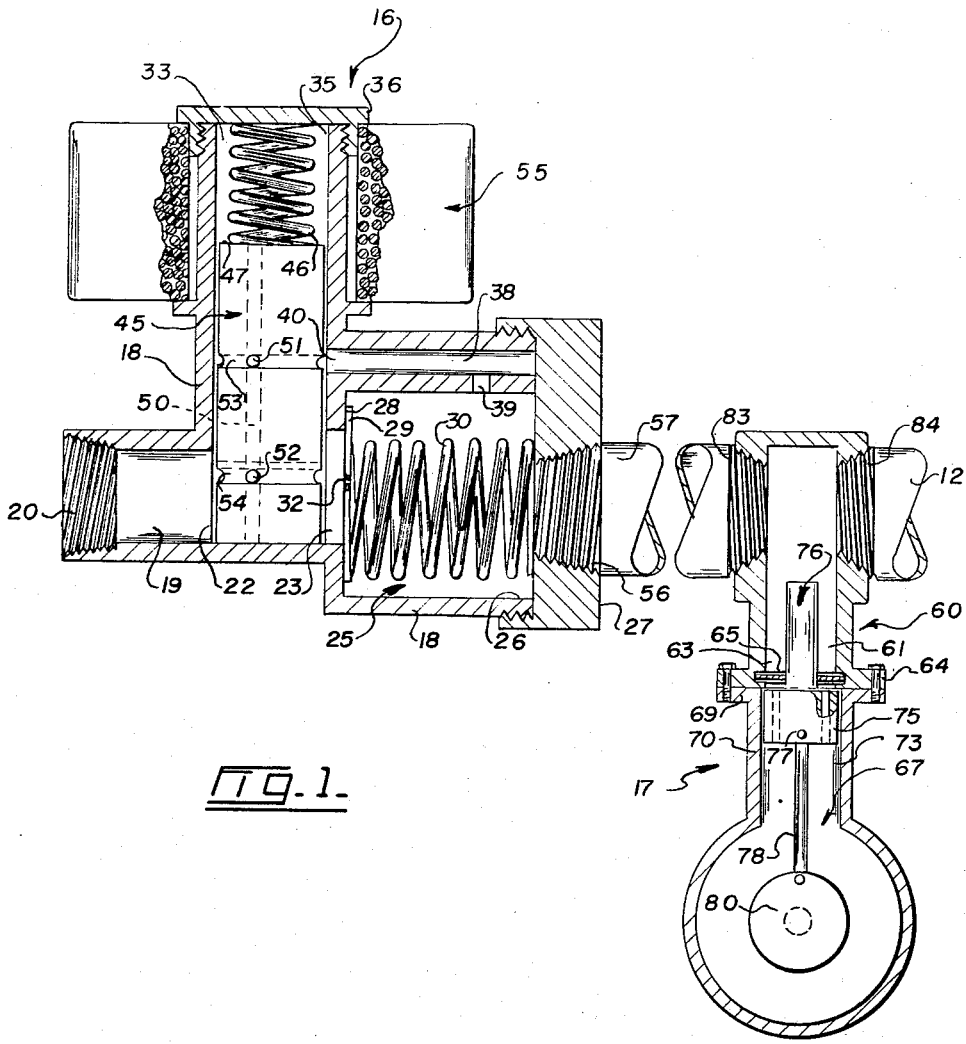

Jan. 2, 1968     J. A. VRIEND     3,361,487
PULSATING BRAKE

Filed Jan. 3, 1966     4 Sheets-Sheet 1

INVENTOR
JOSEPH A. VRIEND
BY
Featherstonhaugh & Co
ATTORNEYS

Jan. 2, 1968   J. A. VRIEND   3,361,487
PULSATING BRAKE
Filed Jan. 3, 1966   4 Sheets-Sheet 3

INVENTOR
JOSEPH A. VRIEND
BY
Fetherstonhaugh & Co.
ATTORNEYS

Jan. 2, 1968 J. A. VRIEND 3,361,487
PULSATING BRAKE

Filed Jan. 5, 1966 4 Sheets-Sheet 4

INVENTOR
JOSEPH A. VRIEND
BY
Featherstonhaugh & Co
ATTORNEYS

United States Patent Office 3,361,487
Patented Jan. 2, 1968

3,361,487
PULSATING BRAKE
Joseph A. Vriend, Government Road, Squamish,
British Columbia, Canada
Filed Jan. 3, 1966, Ser. No. 518,377
8 Claims. (Cl. 303—61)

This invention relates to fluid pressure control braking systems for vehicles, but in particular to a mechanism which automatically actuates the pressure of or pulsates the braking fluid in order to provide intermittent braking of the vehicle.

Devices, have in the past, been designed for causing intermittent operation of wheel brake mechanisms whereby the brakes may be effectively applied on any road surfaces whether slippery or dry. Braking mechanisms of this type, of prior design, have not in the main been entirely successful commercially owing to their complicated and intricate construction which have made the manoeuvre expensive. Furthermore, many of such mechanisms do not provide instant releasable braking pressure when required.

The present invention provides a pulsating brake apparatus for either hydraulic or pneumatic brake systems which may be installed in such systems with little or no change thereto, and which may be operated with the same conventional controls as the present braking systems are now operated. This invention may be used with vehicles of any type, including aircraft.

The present invention furthermore provides a pulsating brake apparatus wherein the pulsations applied to the braking are transmitted only in part to the brake controls and, consequently, although it permits the operator to feel the pulsations, does not hinder or affect his judgment in selecting or engaging the proper amount of braking pressure to be used.

The present invention comprises a check valve in the conduit connection to prevent the return of fluid from the wheel brakes to the generator, a normally open electric circuit, a pressure sensitive switch in the conduit connection between the check valve and generator responsive at a predetermined fluid pressure to close the electrical circuit, exhaust passage means for normally relieving the fluid pressure in the wheel brakes in response to a fluid pressure drop at the generator, electrically actuated valve means operable when the electric circuit is closed for closing the exhaust passage means, electrically actuated pulsator means operable when the circuit is closed for rigidly fluctuating the pressure of the fluid trapped behind the check valves, and bleeding means at the check valves for equalizing the fluid pressure on both sides thereof, said bleeding means permitting only minimal return rate of flow of fluid through the check valve so that the fluid pressure pulsations in the conduit connection on the wheel brake side of the check valve will result in only minimal pressure fluctuation in the conduit connection on the generator side.

Figure 2:
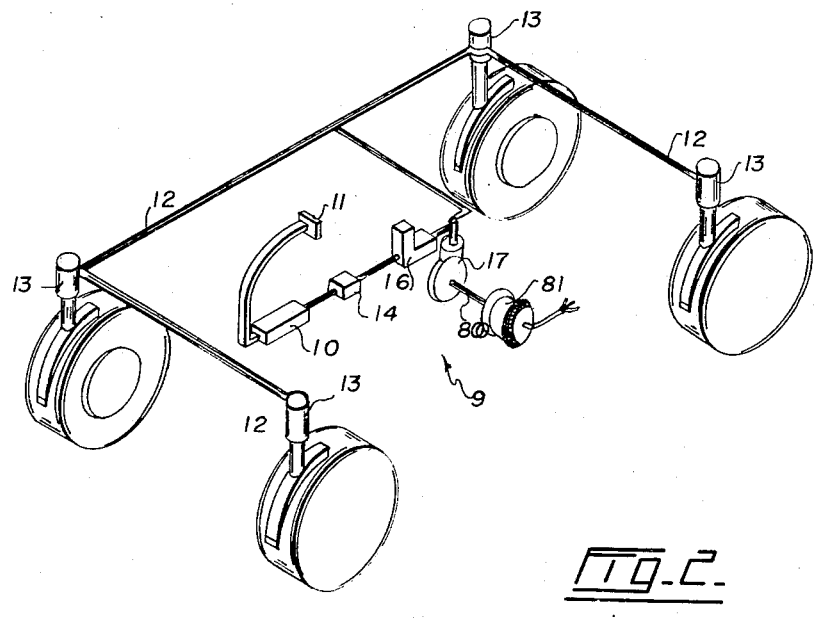
Figure 3:
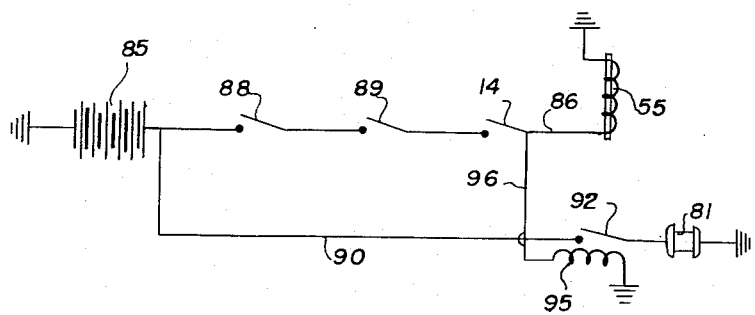
Figure 4:
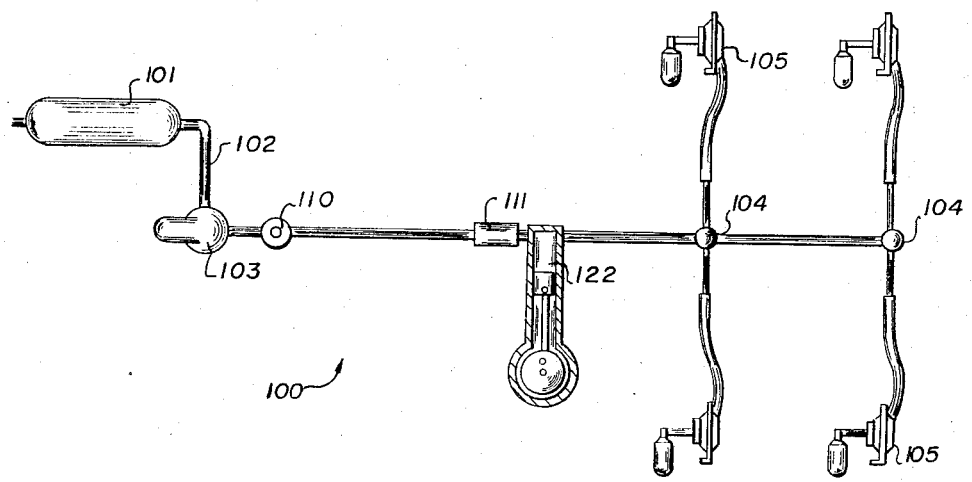
Figure 5:
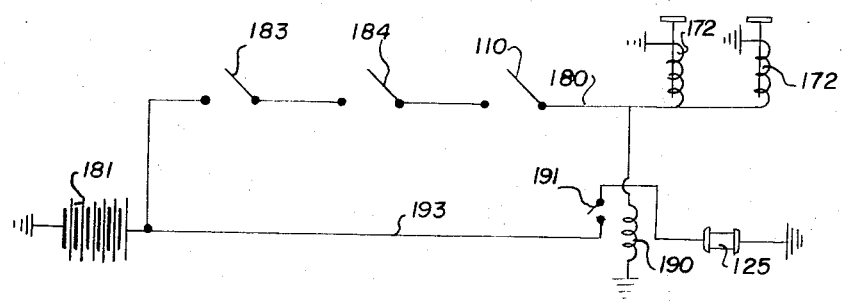
Figure 6:
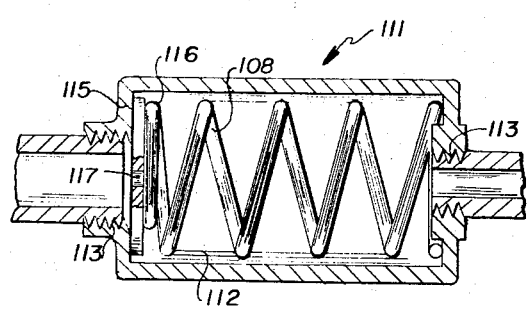

In the drawings which illustrate the embodiments of the invention,

FIGURE 1 is a sectional view of a portion of one embodiment of the invention, illustrating the electrically actuated valve means, check valve and pulsator for hydraulic braking systems, FIGURE 2 is a diagrammatic representation of a hydraulic braking system, the invention being shown schematically to illustrate its position relative to the standard components of the standard hydraulic braking system, FIGURE 3 is a schematic wiring diagram relative to the invention of FIGURES 1 and 2, FIGURE 4 is a diagrammatic representation of a pneumatic braking system with the second embodiment of the invention being illustrated thereby diagrammatically also to show its position relative to the controls and operational portions of a standard pneumatic system, FIGURE 5 is a schematic wiring diagram pertaining to the second embodiment as illustrated in FIGURE 4, and FIGURE 6 is a central sectional view of a valve structure of the embodiment of FIGURE 5.

Referring to the drawings, specifically FIGURES 1, 2 and 3 thereof which illustrate one embodiment 9 of the invention and its use in hydraulic braking systems, there is illustrated in FIGURE 2 a diagrammatic representation of a standard hydraulic braking system with the invention connected therein.

In the standard hydraulic braking system, there is normally provided an oil filled master cylinder 10 which, when operated by a foot pedal 11, forces a hydraulic braking fluid through a conduit connection 12 to the wheel cylinders 13 of the wheel brakes. The pressure may be maintained against the wheel brakes by maintaining a predetermined pressure of the operator's foot against the foot pedal 11 and, when it is desired to release the brakes, the foot is lifted off the foot pedal which permits return springs, not shown, with which the braking systems are usually provided to return the foot pedal to its original position and permit the return of hydraulic fluid through the conduit connection 12.

The embodiment 9 of the invention in general comprises a pressure responsive switch 14 which is installed in the braking system immediately following the master cylinder which, upon a predetermined pressure in the lines being reached, serves to close a pair of contact points in an electrical system, to be hereinafter described.

Following the pressure sensitive switch is a valve assembly 16 which, as to be hereinafter described, serves to prevent the return flow of hydraulic fluid from the wheel brakes upon a predetermined hydraulic pressure being attained in the conduit connection. This trapped hydraulic fluid and wheel cylinder 13 is subjected to the actions of a pulsator 17 which follows the valve 16 and which rapidly fluctuates the hydraulic pressure in the conduit connection of the wheel cylinder side of the valve assembly 16, in a manner hereinafter to be described.

The pressure sensitive switch 14 may be one of the well known types and as considered therefore need not be described in detail. However, it is to be understood that the pressure sensitive switch chosen shall preferably be of an adjustable type and one which is operative to close a pair of electrical contacts when a predetermined pressure is reached. This pressure sensitive switch as indicated before is connected into the conduit connection immediately following the master cylinder.

Following the pressure sensitive switch, is the valve assembly 16. This valve assembly is illustrated in detail in FIGURE 1, and comprises a casing 18 having an elongated fluid passage 19, one end 20 of which is threaded to receive the conduit connection leading from the master cylinder, and the other end 22 of which is ported as at 23 into an elongated valve chamber 25. This valve chamber is closed at its end 26 opposite the port 23 by a cap 27 which has a threaded aperture to also receive a conduit connection. This chamber is formed having a valve seat 28 adjacent the port 23 against which a valve disc 29 is urged by a compression spring 30 extending therebetween and the cap 27. This disc is provided with a pin-hole sized aperture 32 formed centrally therethrough.

Between the ends 20 and 22 of the fluid passage 19 the casing 18 is so formed as to provide an intersecting elongated bore 33 which is closed at its end 35 by a cap 36, and an internal by-pass passage 38 is also provided terminating at one end in a port 39 formed through the walls of the valve chamber 25 adjacent the end 26 of the latter and terminating at its other end in a port 40 formed in the walls of the casing forming the bore 33 substantially intermediate the ends of the latter.

The bore 33 is arranged to slidably receive an elongated cylindrical free piston 45 which has a sliding yet sealable fit to the walls of the bore. A compression spring 46 is inserted under compression between one end 47 of the piston and the cap 36, urging the piston into the passage 19 and against the wall portion 18 of the latter. This piston is provided with an axial bore 50 and a pair of spaced radial bores 51 and 52 which intersect the axial passage 50. These radial bores 51 and 52 terminate at their outer ends in a pair of annular peripheral grooves 53 and 54 formed in the piston. It will be noted that the relationship of the piston and its grooves to the by-pass passage 38 is such that when the piston is pressed by the compression spring 46 against the wall portion 18 of the casing, the annular groove 53 lies in registry with the ported end 40 of the by-pass passage. Adjacent the cap 36 the casing is provided with an embracing electrical solenoid 55 which, when energized by an electrical current as hereinafter to be described, will move the piston 45 upwardly against the compression spring until the groove 53 is no longer in registry with the ported end 40 of the by-pass passage.

The cap 27 enclosing the valve chamber 25 is provided with a threaded conduit receiving aperture 56 which is connected as by the conduit connection, the portion of which herein is numbered 57, to the pulsator 17. This pulsator is of simple construction and simply embodies the principle of rapid intermittent displacement of a small portion of the fluid by means of a reciprocating piston.

The pulsator 17 comprises an upper cylindrical head portion 60 having a central bore 61 opening out at one end 63, said end being fitted with external flanges 64 and being partially closed by an annular seal 65. This head portion 60 fits a lower cylindrical portion 67, the latter having an external flange 69 formed at one end 70 and a longitudinal bore 73 which aligns with the bore 61. This bore 73 serves as a cylindrical guide for a guide piston 75, the latter carrying an elongated cylindrical piston 76 which slidably extends through the seal 65.

This guide piston is connected as by a wrist pin 77 to a connecting rod 78, the latter being journalled on a crank 80 which is rotated by a small electric motor 81. This electric motor is also connected in the same circuit as the solenoid 55, the operation of which will be explained hereinafter. It will be appreciated that reduction of any known type may be utilized for connecting the motor 81 to the crank 80.

The head portion 60 is provided with a pair of threaded ports 83 and 84, conduit connection 57 being threadedly engaged by port 83, and port 84 being connected as by a similar conduit connection to the wheel cylinder 13.

In order to describe the operation of the pulsating apparatus, reference should be made to FIGURE 3 which is a schematic diagram illustrating an electrical wiring circuit through which the solenoid 55 and electric motor 81 are operated.

The solenoid 55 is connected to the standard vehicle battery by a lead 86 through the ignition switch 88, a manual switch 89, and the pressure sensitive switch 14. Closure of all of them is necessary to energize the solenoid. The electric motor 81 is also connected to the battery 85 via lead 90 having a normally open solenoid operated switch 92, the solenoid 95 of which is connected as by lead 96 to lead 86 whereby on the passage of current through solenoid 55, solenoid 95 will also be operated, thereby putting the electric motor in circuit.

As is self-evident, both the ignition and manual switch must be closed in order to place the pulsating mechanism in an operating condition. With these two switches closed, operation of the foot pedal will result in the emission of hydraulic fluid from the master cylinder and through the valve assembly 16 to the wheel cylinders 13. It will be seen that the hydraulic fluid may flow through the valve assembly either through by-pass passage 38 or directly through port 23 and the valve chamber 25 as the disc 29, which serves as a check valve, will be lifted off its seat against the pressure of the spring 30.

When the hydraulic pressure in the conduit connection reaches a predetermined value, that being the pressure at which the pressure sensitive switch 14 operates to close the circuit, the solenoid 55 will be energized, thereby moving the piston 45 against the spring 46 so as to close by-pass passage 38. Closure of the circuit will also initiate operation of the pulsator 17, the reciprocal action of the piston 76 quickly raising and lowering the hydraulic pressure in the conduit connection on the wheel cylinder side of the check valve disc 29. As the disc 29 is provided with the small opening 32 as hereinbefore described, minimal flow of hydraulic fluid is obtained therethrough. This permits pressure equalization on both sides of the disc 29 if the foot pedal is backed off slowly. The small opening, however, during the operation of the pulsator, offers a restriction to the flow of hydraulic fluid when the pressure in the conduit connection on the wheel cylinder side of the disc is fluctuated rapidly by the pulsator. Consequently, the amplitude of pressure variation on the foot pedal side of the disc will be much less than that on the wheel brake side of the disc. This enables the operator to retain his "feel" of the proper hydraulic pressure to be applied, otherwise if the amplitude of pressure variations was the same on the foot pedal as it was on the brakes, the foot pedal would tend to bounce at every pulsation and would very likely tend to affect the operator's judgment as to the proper braking pressure to be applied.

After hydraulic pressures affecting the operation of the pulsator have been reached, continued pressure on the foot pedal to maintain pressures above the predetermined pressure, will maintain the pulsator in operation. The pressure applied by the foot pedal may be slackened off which will result in a slow reduction of the pressure applied to the wheel cylinders until the pressure in the conduit on the pedal side of the disc 29 falls below the operating pressure of the pressure sensitive switch at which point the current will be cut from both the solenoid 59 and the electrical motor, releasing the piston 45 so that the latter will return to a position in which the by-pass passage 38 is opened.

If it should be desired, when operating the wheel brakes at hydraulic pressures above the operating pressure of the pressure responsive switch, to suddenly and quickly release the brake pressure, the foot pedal may be quickly backed off which will permit the pressure in the conduit connection on the pedal side of the disc 29 to drop. When this pressure drops below the operating pressure of the pressure sensitive switch, the solenoid 55 will be de-energized, permitting the piston 45 to return to a position wherein the by-pass passage is again opened, thereby permitting quick release of pressure through the by-pass passage from the conduit connection on the wheel brake side of the disc.

As indicated hereinbefore, the pulsating brake apparatus may also be applied to pneumatic braking systems.

Referring to FIGURES 4, 5 and 6 wherein another embodiment 100 of the apparatus is illustrated in connection with a pneumatic brake system and with particular reference to FIGURE 4, there is illustrated a standard pneumatic braking system wherein compressed gas, such as compressed air, is fed from a reservoir 101 by an air conduit 102 through a standard foot or hand-operated control valve 103, and through quick release valves 104 into brake chambers 105 at each of the wheels. It will be understood, of course, that air is supplied to the reservoir 101 by a standard pump, not shown. In the application of the brakes, the control valve 103 is operated so as to emit compressed pneumatic fluid into the conduits so as to cause the actuation of the wheel brakes. In order to release the wheel brakes, the control valve 103 is positioned so that it will, simultaneously, isolate the reservoir 101, and bleed the pressurized pneumatic fluid from the conduit connection which extends between the control valve and the quick release valves 104.

The quick release valves are so constructed, as hereinafter to be described, so that they will automatically bleed the pneumatic fluid from the conduits leading to the wheel brakes upon a drop in fluid pressure resulting from a release of pressure through the control valve 103. In normal operation of an air brake system wherein it is desired to intermittently apply and release the brakes, this may only be accomplished by quickly operating the control valves so as to intermittently pressurize and depressurize the system. It will, of course, be apparent that during each operation, the compressed pneumatic fluid will escape to the atmosphere through the quick release valves 104. Continuous and lengthy operation of the control valves in a manner to cause pulsations of the brake, will therefore lead to complete exhaustion of the pneumatic fluid in a very short time.

The embodiment 100 of the invention includes in the conduit immediately following the control valve 103, a pressure sensitive switch 110. This pressure sensitive switch may be of any of the standard known types, and which serves to close a pair of normally open contact points when the pressure in the conduit reaches a predetermined value. Following the switch 110 is a single check valve 111. This valve as illustrated in FIGURE 6, comprises an elongated chamber 112 closed at one end by an apertured end wall 113 at either end by an apertured cap 114, the apertures in the wall and cap being threaded to receive air conduits. End wall 113 serves as a seat for a valve disc 116, said disc having a small aperture 117 formed therethrough and being urged against its seat by a compression spring 118 inserted under compression between said disc and said cap 114. The purpose of this check valve is to restrain the flow of pneumatic fluid through the conduit in the direction of the control valve.

Following the check valve between the latter and the quick release valve 104, is a pulsator 122. This pulsator 122 is substantially the same as pulsator 17, the only difference being in the relative fluid displacement of each. As the amplitude of pressure variations in both the pneumatic and hydraulic systems should be substantially the same, it will be apparent that the fluid displacement of pulsator 122 must be much greater than the fluid displacement of pulsator 17 in view of the compressibility of the pneumatic fluid as against the compressible hydraulic fluid.

It is to be understood also that the pulsator 122 is operated by a small electric motor 125 as shown in FIGURE 5 in the same manner as the electric motor 81 of pulsator 17. It will also be appreciated that in place of the piston type pulsator as described herein, a pulsator utilizing a diaphragm rather than a piston may be employed. This is not illustrated as diaphragm pulsating equipment of known manufacture.

Figure 7:
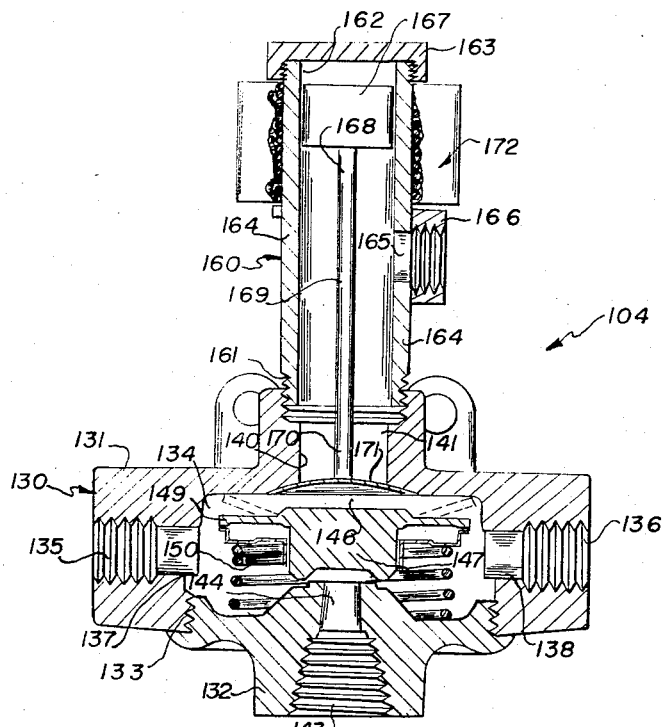

The standard quick release valve, a representative type being shown in FIGURE 7, has a two part hollow casing 130, the parts 131 and 132 thereof having a screw thread connection as at 133. The parts 131 and 132 are so formed so as to provide a cylindrical valve chamber 134, the said one part 131 being provided with screw threaded passages 135 and 136 ported at 137 and 138, respectively, into the chamber 134, and to which conduit connections to the wheel brakes may be made. Part 131 is also provided with a central screw threaded passageway 140 to which the line conduit from the pulsator is connected and which is also ported into the chamber as at 141. The other part 132 is also provided with a passage 143 ported as at 144 into the chamber 134, said port 144 lying directly below port 141.

The chamber contains a diaphragm valve element 146 having a central core 147 and an annular extending flange 149. This diaphragm is preferably made of a rubbery material so that the flange is capable of resilient flexible action.

This flange 149 is, when not subject to the action of the pressurized pneumatic fluid, forced upwardly against the valve casing part 131 by the action of a compression spring 150. The position of the flange 149 in this position being shown in dotted lines in FIGURE 7. This, it will be seen, closes passage 140 to the passages 135 and 136 and also passage 143. The core 147 of the valve element 146 is also lifted off the valve casing part 132 to provide communication between ports 137–138 and port 144, the latter being an exhaust port subject to atmospheric pressure.

When, in the standard pneumatic system, pressure is applied through passageway 140, valve element 146 is deflected, the core 147 being forced downwardly over and closing the port 144. Upon increasing the pressure, the flange 149 is forced downwardly away from part 131 and the air thereby emitted through passageways 135 and 136 respectively into the wheel brakes. In order to release the wheel brakes, the pressure is simply diminished in passageway 140 by means of bleeding the air out of the conduits through the control valve 103. The diminution of pressure in the chamber will consequently permit the higher pneumatic pressure in the lines leading to the wheel chambers to lift the core 147 off the port 144 to permit the air from the wheel brakes to exhaust through passage 143. It will be seen that when pulsating the brakes, the pneumatic fluid will continually be lost through the exhuast passage 143 and an action which quite often results in complete exhaustion of the pneumatic fluid in the reservoir.

In keeping with the objects of this invention, the quick release valves 104 are provided with means whereby during the operating of the pulsator 122, the exhaust port 141 may be maintained closed regardless of the pressure fluctuation of the pneumatic fluid.

These means are illustrated in FIGURE 7, and comprise an elongated cylindrical tube 160 threaded at its end 161 so as to be threadedly engageable with the port 141 and closed at its other end 162 by a threaded cap 163. The walls 164 of the tube are provided with an aperture 165 spaced intermediately between the ends 161 and 162, said aperture having a threaded sleeve 166 centered thereover, said sleeve being arranged to receive the conduit connection extending from the pulsator 122.

The portion of the tube 160 between the sleeve 166 and cap 163 slidably embraces a longitudinally slotted piston 167, the latter being connected to one end 168 of an elongated shaft 169 which extends down through the passageway 140 and carries at its other end 170 a circular apertured pressing foot 171 which is located coaxially to and above the core 147 of the valve element 146. This piston 167 is normally urged upwardly by a compression spring 171a and serves as a plunger for a solenoid 172 which encircles the tube 160 adjacent its capped end 162 and which, when energized, serves to operate the piston 167 against the spring 171a so that the pressing foot 171 is urged downwardly against the valve element 146 to press the core 147 over the port 144 and to press the flange 149 against the spring 150 and away from casing part 132 so as to place passageway 140 in communication with passageways 135 and 136.

The solenoid 172 and motor 125 are both connected into the electrical system of the vehicle as shown schematically in FIGURE 5. The solenoid 172, two being shown in this figure, is operated through a line connection 180 to the battery 181 through the ignition switch 183, a master control switch 184 and the pressure sensitive switch 110, said solenoid being energized when all said switches are closed. Closure of the switches also operates a solenoid 190 which closes a switch 191 in a lead 193 connecting the battery and the electric motor 125.

In the operation of apparatus 10, the control valve 103 is operated to pressurize the line conduit which also results in pressurizing of the wheel brakes. When the pressure has risen sufficiently in the conduits to effect closure of the pressure sensitive switch, the solenoids 172 and 190 are both energized, resulting in simultaneous closing of the quick release valve 104 to atmosphere and the operation of the pulsator 122. The aperture check valve 111 will of course permit the pressure of the pneumatic fluid on both sides thereof to be balanced, and thereby permit slow reduction of braking pressure without the exhaustion of the pneumatic fluid in the wheel brakes to atmosphere. The pneumatic pressure may of course be reduced to the point at which the pressure sensitive switch will again operate to open the circuit at which time both solenoids 172 and 190 will be de-energized, permitting the air and pneumatic fluid in the wheel brakes to exhaust to atmosphere through the quick release valves.

It will be seen, however, that during the period in which the pneumatic fluid is subjected to pulsations, there will be no loss thereof to atmosphere as is the case in standard systems.

What I claim as my invention is:

1. Pulsating brake apparatus for fluid brake systems for vehicles having an operator controlled fluid pressure generator, fluid actuated wheel brakes and a fluid conduit connection between the generator and wheel brakes comprising a check valve in the conduit connection to prevent the return of fluid from the wheel brakes to the generator, a normally open electric circuit, a pressure sensitive switch in the conduit connection between the check valve and generator responsive at a predetermined fluid pressure to close the electrical circuit, exhaust passage means for normally relieving the fluid pressure in the wheel brakes in response to a fluid pressure drop at the generator, electrically actuated valve means operable when the electric circuit is closed for closing the exhaust passage means, electrically actuated pulsator means operable when the circuit is closed for rigidly fluctuating the pressure of the fluid trapped behind the check valves, and bleeding means at the check valves for equalizing the fluid pressure on both sides thereof, said bleeding means permitting only minimal return rate of flow of fluid through the check valve so that the fluid pressure pulsations in the conduit connection on the wheel brake side of the check valve will result in only minimal pressure fluctuation in the conduit connection on the generator side.

2. Pulsating brake apparatus as claimed in claim 1 in which the pulsating means comprises a cylinder connected in the conduit connection so as to be filled with the brake fluid, a piston in the cylinder being adapted when reciprocated to increase and decrease the volume of fluid, and an electric motor in the electrical circuit and connected to the piston for reciprocating the latter when the circuit is closed.

3. Pulsating brake apparatus for hydraulic brake systems for vehicles having an operator controlled fluid pressure generator, fluid actuated wheel brakes and a fluid conduit connection between the generator and wheel brakes comprising a check valve in the conduit connection to prevent the return of fluid from the wheel brakes to the generator, a normally open electric circuit, a pressure sensitive switch in the conduit connection between the check valve and generator responsive at a predetermined fluid pressure to close the electrical circuit, exhaust passage means by-passing the check valve to permit return flow of fluid from the wheel brakes to the generator when the fluid pressure at the generator is closed for closing the exhaust means, an electrically operated valve in the exhaust passage means normally spring urged to an exhaust passage open position and being adapted when actuated by closure of the circuit to move against the action of its spring to a passage closed position so as to trap the fluid in the conduit connection on the wheel brake side of the check valve, electrically actuated pulsator means operable when the circuit is closed for rapidly fluctuating the pressure of the fluid trapped behind the check valve, and bleeding means at the check valves for equalizing the fluid pressure on both sides thereof, said bleeding means permitting only minimal return rate of flow of fluid through the check valve so that the fluid pressure pulsations in the conduit connection on the wheel brake side of the check valve will result in only minimal pressure fluctuation in the conduit connection on the generator side.

4. Pulsating brake apparatus as claimed in claim 3 wherein the check valve is of the spring closed disc type, the disc thereof having a pin-hole formed therethrough, said hole constituting the bleeding means.

5. Pulsating brake apparatus as claimed in claim 3 wherein the electrically operated valve comprises a piston reciprocally movable in the exhaust passage between passage open and passage closed positions, a spring urging the piston to a valve open position, and a solenoid of which the piston forms a plunger connected in the circuit so as to be energized when the circuit is closed and moving the piston to a passage-closed position against the operation of the spring.

6. Pulsating brake apparatus for pneumatic brake systems for vehicles having an operator controlled air pressure generator, pneumatically actuated brakes and an air line between the generator and wheel brakes comprising a check valve in the air line to prevent the return of air from the wheel brakes to the generator, a normally open electrical circuit, a pressure sensitive switch in the air line between the check valve and generator responsive at a predetermined air pressure to close the electrical circuit, an exhaust port in the air line between the check valve and wheel brakes for exhausting the air in the wheel brakes to atmosphere, a quick release valve at said port having a movable diaphragm normally closing the exhaust port when the air pressures in the air line at the generator and wheel brakes are substantially equal and being automatically operable when the pressure in the air line at the generator is less than the pressure at the wheel brakes for opening the port so as to permit the air at the wheel brakes to exhaust to atmosphere, an electrically actuated member engageable with the diaphragm when the circuit is closed to urge said diaphragm to an exhaust closed position against and closing the port so as to prevent the escape of air from the wheel brakes through said port, electrically actuated pulsator means operable when the circuit is closed for rapidly fluctuating the pressure of the air trapped behind the check valve, and bleeding means at the check valve for equalizing the air pressure on both sides thereof, said bleeding means permitting only minimal return rate of flow of air through the check valve so that the air pressure pulsations in the air line on the wheel brake side of the check valve will result in only minimal pressure fluctuation in the air line on the generator side.

7. Pulsating brake apparatus as claimed in claim 6 wherein the check valve is of the spring closed disc type, the disc thereof having a pin-hole formed therethrough, said hole constituting the bleeding means.

8. Pulsating brake apparatus as claimed in claim 6 wherein the movable member comprises a solenoid operated plunger having a foot at one end engageable with one side of the diaphragm to urge the latter, when the solenoid is energized, in the direction of and against the exhaust port so as to close the latter.

References Cited

UNITED STATES PATENTS

| | | | |
|---|---|---|---|
| 2,270,586 | 1/1942 | Jahant et al. | 188—85 |
| 2,904,960 | 9/1959 | Aikman | 188—85 X |
| 3,231,315 | 1/1966 | Turnbull | 303—61 |

DUANE A. REGER, *Primary Examiner.*